(12) United States Patent
Kozaka et al.

(10) Patent No.: US 6,231,202 B1
(45) Date of Patent: May 15, 2001

(54) LIGHTING UNIT AND LIQUID CRYSTAL DISPLAY DEVICE USING THE SAME

(75) Inventors: Yukihiro Kozaka; Mitsuo Nomura, both of Ishikawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/377,174

(22) Filed: Aug. 19, 1999

(30) Foreign Application Priority Data

Aug. 20, 1998 (JP) .................................................. 10-251839

(51) Int. Cl.⁷ ........................................................ F21K 27/00
(52) U.S. Cl. ........................... 362/31; 362/31; 362/260; 362/23; 362/26; 362/318; 362/390; 362/369; 362/216; 349/70; 349/25
(58) Field of Search ......................... 362/31, 260, 23, 362/24, 318, 390, 369, 216, 306; 349/70, 25

(56) References Cited

U.S. PATENT DOCUMENTS

| 4,842,378 | * | 6/1989 | Flasck et al. ....................... 350/345 |
| 4,950,053 | * | 8/1990 | Haim et al. ............................ 362/31 |
| 5,990,989 | * | 11/1999 | Ozawa ................................. 349/110 |
| 6,050,704 | * | 4/2000 | Park ..................................... 362/260 |
| 6,108,060 | * | 8/2000 | Funamoto et al. ..................... 349/65 |
| 6,111,622 | * | 8/2000 | Abileah ................................. 349/61 |

FOREIGN PATENT DOCUMENTS

94/01795   1/1994   (WO) .

* cited by examiner

Primary Examiner—Sandra O'Shea
Assistant Examiner—Anabel Ton
(74) Attorney, Agent, or Firm—Wenderoth, Lind & Ponack, LLP

(57) ABSTRACT

A lighting unit includes a housing, a light-conductive-panel and a fluorescent lamp, and has a space between the panel and a side wall of the housing. The lamp has electrodes on both its ends and a curved-corner. The space has different widths at sections where the electrodes are rested and at a section where the curved-corner is rested, and accommodates the lamp therein. The lighting unit is compact in size and has better shock resistance, as well as vibration resistance. The lighting unit and an LCD are integrated into a compact and highly reliable LCD device.

10 Claims, 6 Drawing Sheets

LIGHTING UNIT AND LIQUID CRYSTAL DISPLAY DEVICE USING THE SAME

FIELD OF THE INVENTION

The present invention relates to a lighting unit employed in a translucent type liquid crystal display (LCD) device and an LCD device using the same lighting unit.

BACKGROUND OF THE INVENTION

In recent years, LCD devices have been widely used as a display unit of information apparatuses such as a notebook type personal computer (PC), a word processor and the like, and video apparatuses such as a portable television, a camcorder, a car-navigation system and the like. Those apparatuses require a display unit to be lightweight, have a slim body and have a low power consumption, and the LCD device meets these requirements. Many of the LCD devices are equipped with a lighting unit therein to realize a bright screen, where the lighting unit radiates behind the display.

There are two types of lighting units depending on a position of the light source, i.e. an edge-light type and a back-light type. In the edge-light type lighting unit, a light-conductive-panel is placed behind the LCD, and a line-light-source such as a fluorescent lamp is disposed at edges of the light conductive-panel. In the back-light type lighting unit, light sources are disposed just behind the LCD. The back-light type produces rather higher brightness but is not good for a slim housing, on the other hand, the edge-light type is good for a slim housing and has more uniform brightness on a light emitting-face but cannot produce high brightness.

The edge-light type lighting unit of LCD device has been preferred for a notebook type PC because of its thinner body. The edge-light type lighting unit has been also preferred for a camcorder and a car-navigation system, where the edge-type lighting units are equipped with a plurality of fluorescent lamps, an L-shaped lamp, or U-shaped lamp, in order to keep both the advantages, i.e. thinner body and high brightness.

FIG. 6 and FIG. 7 illustrate a conventional edge-light type lighting unit employing an L-shaped fluorescent lamp.

In FIGS. 6 and 7, this lighting unit comprises the following elements:

(a) a transparent light conductive panel 51 for transmitting light;

(b) an L-shaped fluorescent lamp 52 disposed adjacent to two sides out of four sides of a panel 51;

(c) reflecting film 54 for leading the light illuminated by the lamp 52 to an incident face 53 of the panel 51;

(d) a reflector sheet 55 disposed behind the panel 51 and reflecting the light going outside from a rear face of the panel 51 to inside the panel 51, thereby increasing illuminating light to be emitted from an outgoing face; and (e) a diffusion panel 56 disposed on the front face (outgoing face) for increasing the uniformity of outgoing light.

In addition to those elements discussed above, there are still other elements such as: lead wires 58 connected to both electrodes 57 of lamp 52 for supplying a voltage from outside; a power supply such as an inverter (not shown) generating high frequency alternating current, and the power supply being wired to respective lead wires 58 via other lead wires 59 connected to the lead wires 58 by soldering; rubber holders 60 made of an insulating material such as rubber and formed in a cylindrical tube, holders 60 provided to cover exposed sections of respective lead wires 58 and 59 to secure safety because driving the lamp 52 generally requires a high voltage.

The light conductive panel 51, the lamp 52 and other elements are held by a housing 61 so that the lighting unit is formed. The lamp 52 is disposed at a space 62 between the panel 51 and a side wall 70 of the housing 61. At the same space 62, the lead wires 59 are disposed for supplying a voltage to the lamp 52.

A rear face cover 64 is disposed on the rear side of the housing 61 so that the panel 51 and the lamp 52 and others are secured and protected from outside.

However, the lighting unit constructed as discussed above has the following problems.

When the L-shaped fluorescent lamp 52 and lead-wires 59 are placed at the space 62 between the light conductive panel 51 and the side wall 70 of the housing 61, enough allowance is preferably provided at space 62. Because of the deviation of a curved-corner section 63 of the lamp 52 (approx. ±1°) and dimensional deviations of other components must be taken into consideration, otherwise the lamp 52 or the lead-wires 59 cannot be placed at the space 62. If the lamp 52 and lead-wires 59 are tightly placed at the space 62 without enough room in the width direction, these elements will touch the housing 61 or the light conductive panel 51, i.e., the heaviest element in the lighting unit and close to a rigid body, when the lighting unit is subjected to vibration or shock from the outside. As a result, the lamp 52 is damaged, or lead-wires 59 are cut due to the shock. Further, the space 62 must have enough width secured in addition to an effective emission area 500, whereby the dimensions of the entire lighting unit become larger.

SUMMARY OF THE INVENTION

The present invention addresses the problems discussed above and aims to provide a compact lighting unit with excellent shock resistance as well as vibration resistance, and an LCD device using the same lighting unit.

The lighting unit of the present invention comprises the following elements:

(a) a fluorescent lamp having an L-shaped corner or U-shaped corners and disposed close to end faces of an incident face of alight-conductive-panel; and (b) a housing for holding the light-conductive-panel and the lamp. The lamp is placed at a space between the panel and a side wall of the housing.

In the construction discussed above, the width of the space has different values at the places where both electrodes on lamp ends are disposed and at another place where a curved-corner section is disposed. This construction allows the entire lighting unit to be compact, and at the same time, it also allows the lamp to be disposed at the space even if a corner angle has a deviation and other components have dimensional deviations. As a result, a lighting unit with excellent shock resistance, as well as vibration resistance can be realized.

The LCD device of the present invention includes the lighting unit discussed above and a translucent LCD disposed on the outgoing side of the light conductive panel, so that a compact and highly reliable LCD device can be achieved.

DETAILED DESCRIPTION OF THE INVENTION

Exemplary embodiments of the present invention are described hereinafter with reference to the accompanying drawings.

Exemplary Embodiment 1

Figure 1:
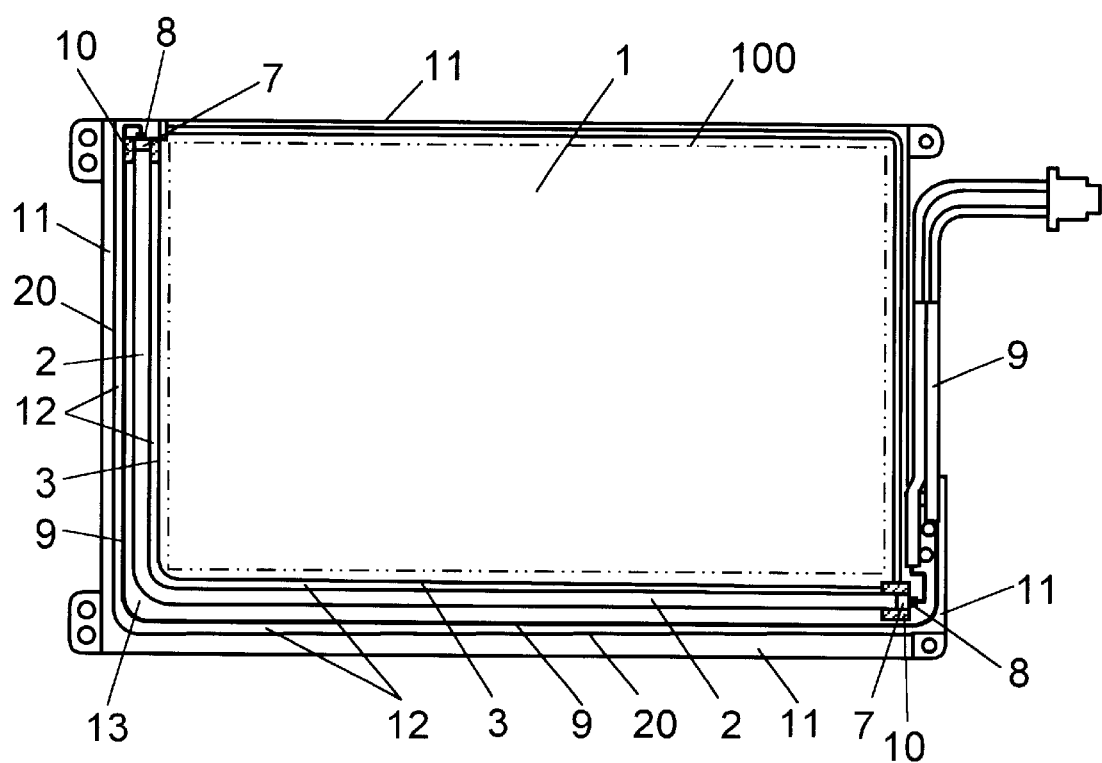
FIG. 1 is a plan view of alighting unit in accordance with a first exemplary embodiment of the present invention.
Figure 2:
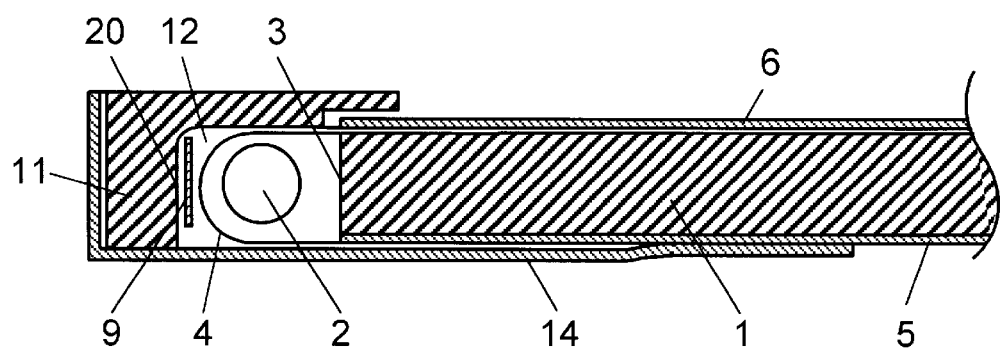
FIG. 2 is a cross section of a side view illustrating a construction of the same lighting unit shown in FIG. 1.
Figure 3:
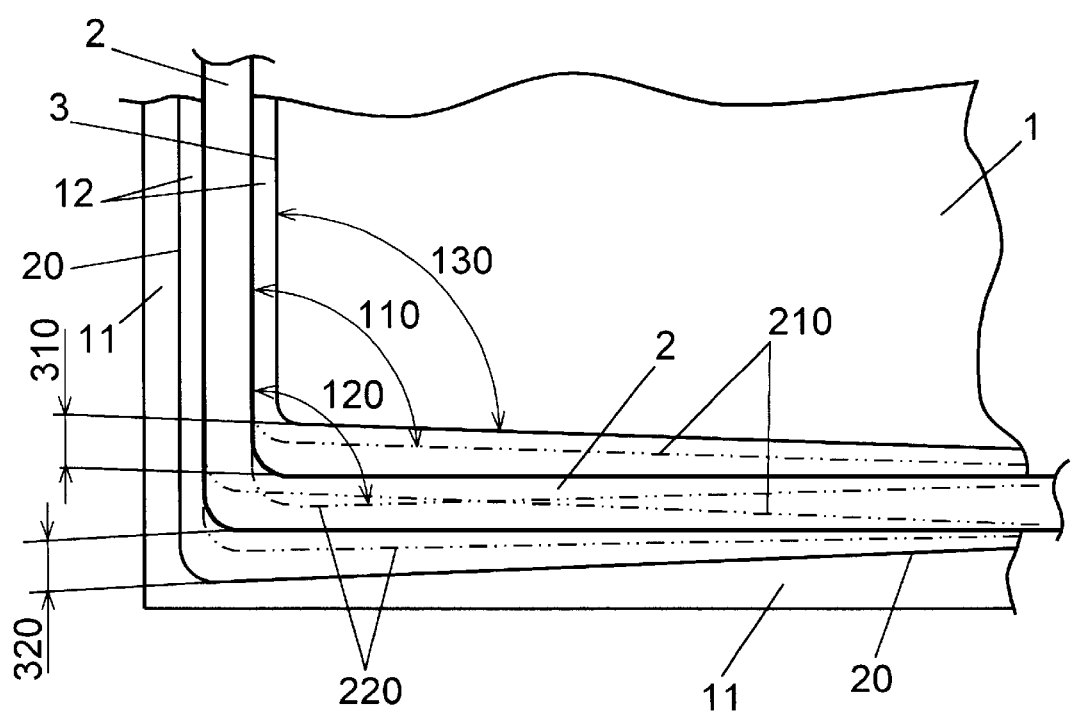
FIG. 3 illustrates a curved-corner section of the same lighting unit in detail.

As shown in FIG. 1 through FIG. 3, a lighting unit of the present invention comprises the following elements:

(a) a transparent light-conductive-panel 1 made of a material such as acrylic resin having a transmission factor and a refraction factor acceptable for transmitting light;

(b) an L-shaped fluorescent lamp 1 placed along end faces 3 of an incident face of the panel 1;

(c) a reflecting film 4 for leading the light radiated by the lamp 1 into the inside of the panel 1 through the end faces 3;

(d) a reflector sheet 5 disposed on a rear face of the panel 1 and reflecting the light going outside into the inside of the panel 1, thereby increasing the light to be radiated from the outgoing face;

(e) dotted patterns or grooved patterns (not shown) formed on the rear face of the panel 1, the size and density of the patterns being varied depending on a distance from the lamp 2;

(f) a diffusion panel 6 disposed on a front face of the panel 1 to make the outgoing light of the lighting unit uniform;

(g) lead-wires 8 connected to both electrodes 7 of the lamp 2;

(h) ther lead-wires 9 connecting a power supply (not shown) and the lead-wires 8;

(i) a hollow holder 10 made of insulating material such as rubber, covering naked sections of the respective lead-wires 8 and 9, as well as holding the lamp 2 and the lead-wires 9 therein;

(j) a housing 11 made from molded resin and shaped as a box for the holding panel 1, lamp 2 and others. An opening is provided on an upper face of the housing 11 for the illuminating light to exit. An effective emitting area is denoted with reference number 100 in FIG. 1.

(k) a rear face cover 14 disposed on a rear side of the housing 11 for holding and protecting the panel 1 and lamp 2.

The holder 10 insulates naked sections of the electrodes, thereby securing the safety of the device. The lead-wires 9 coupled to the lamp 2 lie along the lamp 2.

The reflecting film 4 made of white colored material with a high reflecting factor is formed at both ends along the holder 10, and the sections other than both the ends form an arc so that an approximately constant distance can be kept from the lamp 2. A contacting section of the film 4 with the panel 1 is fixed to the panel 1 with adhesive.

A width of space 12 formed between a side wall 20 of the housing 11 and end face 3 of the incident side of the panel 1 is defined such that: the width becomes gradually wider from the sections where electrodes 7 are disposed to the section where a curved-corner 13 of the lamp 2 is disposed.

This structure discussed above allows the space 12 to accommodate the lamp 2 and lead 2 wires 9 even if the corner angle has a deviation and other components have dimensional deviations. As a result, the entire lighting unit can be compact in dimensions.

FIG. 3 further details the present invention. As shown in FIG. 3, the width of the space 12, where a longer side of the lamp 2 lies, becomes gradually wider from the section where an electrode of the lamp 2 is disposed to the section where curved-corner is disposed. As a result, the lamp 2 can be kept free from touching the side wall 20 or the panel 1 even if the corner angle has a deviation either inward or outward.

In other words, when the curved-corner section of the lamp 2 has an outward deviation, i.e., a corner angle 110 is greater than a right angle, the lamp indicated with a phantom line 210 can be disposed at the space 12 without touching the side wall 20 or panel 1 because room 310 is provided.

On the other hand, when the curved-corner section of the lamp 2 has an inward deviation, i.e., a corner angle 120 is less than a right angle, a ramp indicated with a phantom line 220 can be rested at the space 12 without touching the side wall 20 or panel 1 because room 320 is provided.

To widen the curved-corner section of the space 12, the thickness of the housing 11 around the corner section is gradually thinned to the corner, and an angle 130 of the panel 1 forms an obtuse angle slightly larger than a right angle. The thickness of the housing 11 and the angle 130 of the panel 1 can be determined depending on the angle deviation of the lamp 2 at the curved-corner and the dimensional deviations of respective components.

In FIG. 3, the widened area is provided at the longer side of the curved-corner. However, the area can be provided at the curved-corner striding over both the shorter and longer sides, or the area can be provided at the shorter side of the corner. When the widened area is provided at the shorter side of the corner, the area can be gradually further widened to an upper end of the shorter side.

With regard to a deviation of an angle, deviation of shorter-side-end with reference to the longer side of the lamp 2 as a base line is less than that of longer side end with reference to the shorter side of the lamp 2. Therefore, the widened area of the space 12 provided on the shorter side requires less width with regard to an angle deviation for accommodating the lamp 2 than the widened area on the longer side does. The widened area thus can be narrower, and the entire lighting unit can be further compact accordingly.

In the conventional lighting unit, the lamp and lead-wires are vulnerable to damage due to touching the panel or housing when an intense force from outside such as a vibration or shock is applied. In this first embodiment, the space 12 is gradually widened from the sections where electrodes 7 are rested to the section where the curved-corner section 13 is disposed for accommodating the lamp 2 together with the lead-wires 9. As a result, the lamp 2 and lead-wires 9 are prevented from the touching panel 1 and housing 11, thereby minimizing the damages.

Further, the rear face cover 14 is disposed on a rear side of the housing 11 so that the panel 1 and lamp 2 are secured and protected.

Exemplary Embodiment 2

Figure 4:
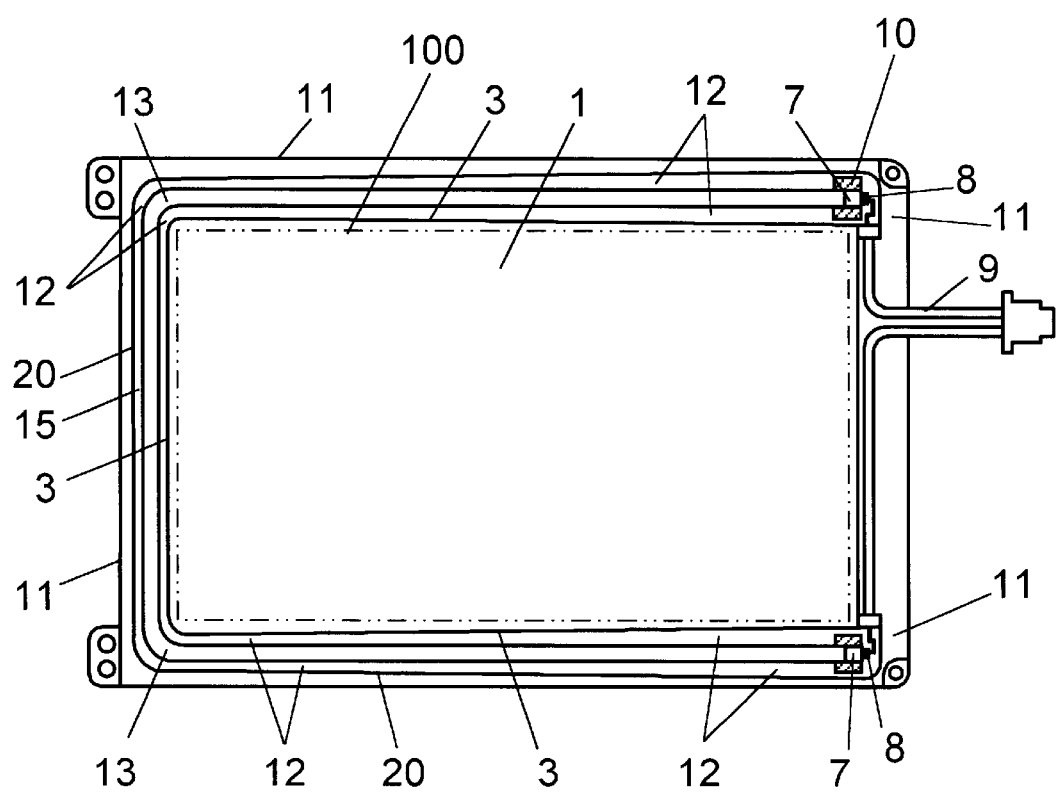
FIG. 4 is a plan view illustrating a construction of a lighting unit in accordance with a second exemplary embodiment of the present invention.

FIG. 4 is a plan view illustrating a lighting unit in accordance with the second exemplary embodiment of the present invention. In FIG. 4, the elements already described in FIG. 1 are denoted with the same reference numbers and their descriptions are omitted here.

In FIG. 4, a U-shaped fluorescent lamp 15 is disposed along the end faces 3 of the incident side of alight-conductive-panel 1. Contrary to the first embodiment, the space 12 between the end faces 3 and side wall 20 of the housing 11 is gradually widened from sections where the curved-corner sections 13 of the lamp 15 are disposed to sections where both the electrodes 7 are disposed.

This construction allows the spaces 12 around both the electrodes 7 to be wider. Even if a corner angle of the lamp 15 has a deviation, the space 12 thus can accommodate the lamp 15 with ease. In other words, when the U-shaped lamp 15 is used as this second embodiment, widened sections are provided on the ends of the two longer sides, and the lamp 15 can be disposed with reference to a shorter side.

The space 12 in accordance to the second embodiment can be formed such that the thickness of the housing 11 can be thinned gradually from the sections where the curved-corner sections 13 of the lamp 15 are disposed to the sections where both the electrodes are disposed. Another way is that the longer sides of the panel 1 can be shaved so that their angles at the sections where the corner sections 13 of the lamp 15 are disposed can form an acute angle less than a right angle.

The second embodiment proves that the space 12 can accommodate the lamp 15 with all angle deviations of the corner sections 13 and deviations of other components. As a result, a lighting unit as a whole can be compactly designed.

Exemplary Embodiment 3

Figure 5:
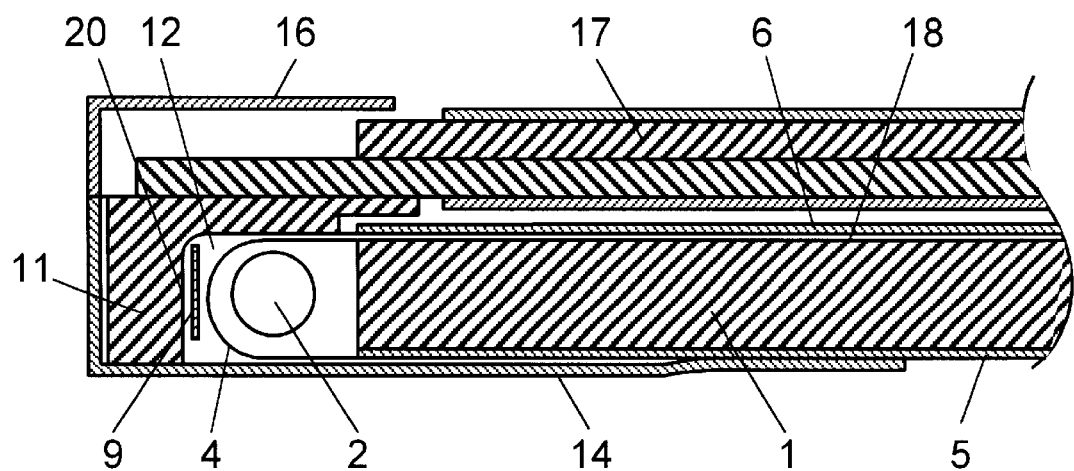
FIG. 5 is a cross section of a side view illustrating a construction of an LCD device in accordance with a third exemplary embodiment of the present invention.
Figure 6:
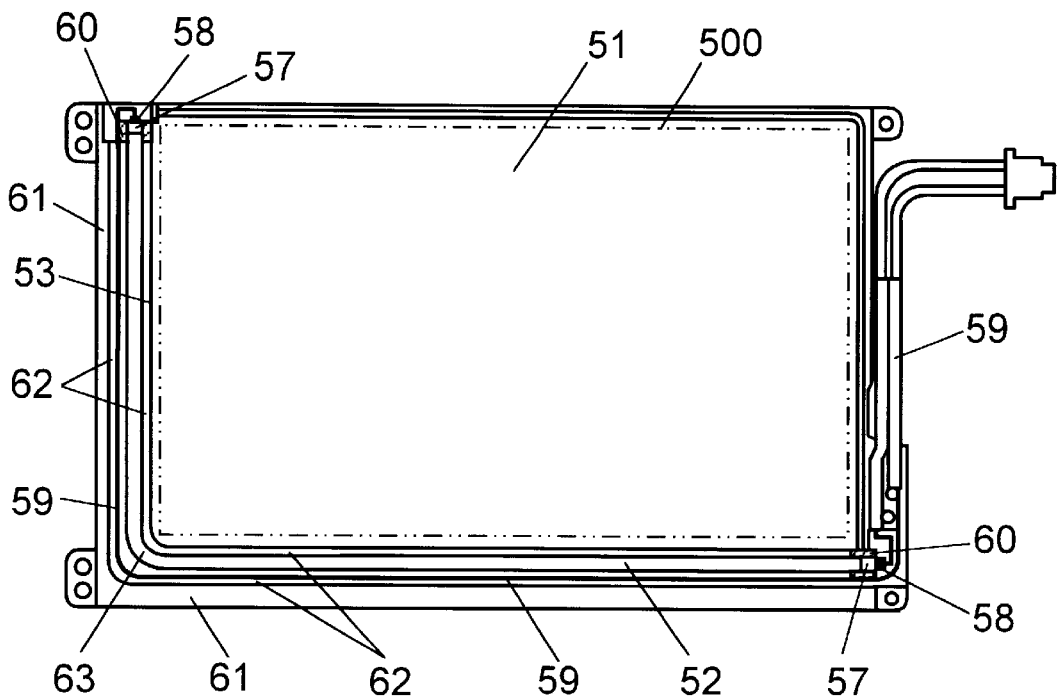
FIG. 6 is a plan view illustrating a construction of a conventional lighting unit.
Figure 7:
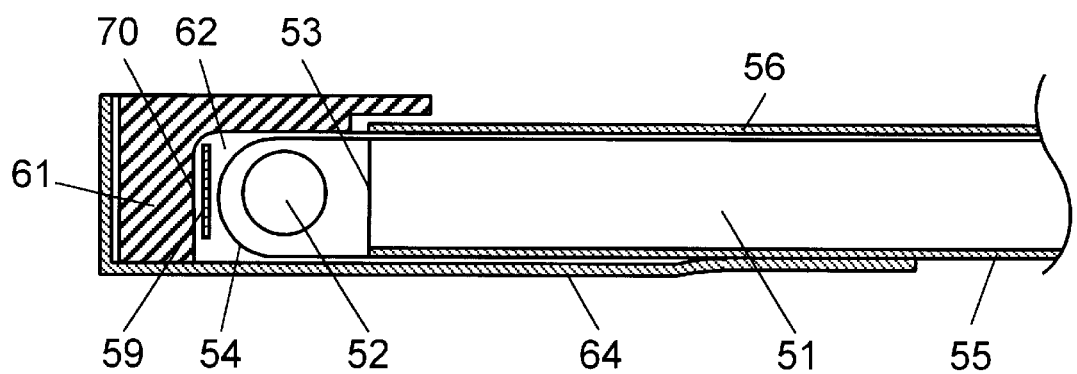
FIG. 7 is a cross section of a side view illustrating the construction of the same lighting unit shown in FIG. 6.

FIG. 5 is a cross section of a side view illustrating an LCD device employing the lighting unit of the present invention. The elements already described in FIG. 2 are denoted with the same reference numbers and their descriptions are omitted here.

The LCD device in accordance with the third embodiment comprises the following elements:
(a) a lighting unit including a fluorescent lamp 2 having a curved corner resulting in an "L" shape, a panel 1 and a reflecting film 4;
(b) a shield case 16; and
(c) a LCD panel 17.

The LCD panel 17 is placed on a front face of the panel 1, i.e., the outgoing face 18, the LCD panel 17 is lit up from behind. The fluorescent lamp can be U-shaped as described in the second embodiment instead of L-shaped.

The LCD device in accordance with this third embodiment comprises the lighting unit that is smaller in size, and has better shock resistance as well as vibration resistance than a conventional lighting unit. Therefore, an LCD device in a small body and having excellent shock resistance, as well as vibration resistance can be realized.

The lighting unit of the present invention has an L-shaped or U-shaped fluorescent lamp having a curved-corner section is disposed along end faces of an incident face of the light-conductive-panel, and a housing for holding the panel and the fluorescent lamp. A space between the panel and a side wall of the housing accommodates the lamp. The space has different widths at sections where respective electrodes on both the ends of lamp are disposed and at a section where a curved-corner of lamp is disposed. This structure allows the lighting unit to have compact dimensions. Even if a corner angle has a deviation and the components have dimensional deviations, this structure permits the lighting unit to accommodate the lamp. As a result, the lighting unit and an LCD device employing the lighting unit can be provided with excellent shock resistance and vibration resistance.

What is claimed is:

1. A lighting unit, comprising:
   an L-shaped fluorescent lamp having a curved corner and an electrode at one end;
   a housing having a side wall; and
   a light-conductive-panel arranged in relation to said side wall such that a space is created therebetween, wherein said curved corner and said electrode of said L-shaped fluorescent lamp are located within the space and the space gradually widens from a section where said electrode is disposed to a section where said curved corner is disposed.

2. A lighting unit as claimed in claim 1, wherein said L-shaped fluorescent lamp further comprises a longer side disposed in the space and extending between said electrode and said curved corner, wherein the space where said longer side is located gradually widens from the section where said electrode is disposed to the section where said curved corner is disposed.

3. A lighting unit as claimed in claim 1, wherein said L-shaped fluorescent lamp further comprises a shorter side disposed in the space and extending between said electrode and said curved corner, wherein the space where said shorter side is located gradually widens from the section where said electrode is disposed to the section where said curved corner is disposed.

4. A lighting unit, comprising:
   an L-shaped fluorescent lamp having a curved corner and a shorter side;
   an electrode located at an end of said shorter side;
   a housing having a side wall; and
   a light-conductive-panel arranged in relation to said side wall such that a space is created therebetween, wherein said curved corner and said electrode of said L-shaped fluorescent lamp are located within the space and the space gradually widens from a section where said curved corner is disposed to a section where said electrode at said end of said shorter side is disposed.

5. A lighting unit, comprising:
   a U-shaped fluorescent lamp having a curved corner and an electrode at one end;
   a housing having a side wall; and
   a light-conductive-panel arranged in relation to said side wall such that a space is created therebetween, wherein said curved corner and said electrode of said U-shaped fluorescent lamp are located within the space and the space gradually widens from a section where said curved corner is disposed to a section where said electrode is disposed.

6. A liquid crystal display device, comprising:
   a translucent type liquid crystal display panel;
   a lighting unit connected to said translucent type liquid crystal display panel, said lighting unit comprising:

an L-shaped fluorescent lamp having a curved corner and an electrode at one end, a housing having a side wall, and a light-conductive-panel arranged in relation to said side wall such that a space is created therebetween, wherein said curved corner and said electrode of said L-shaped fluorescent lamp are located within the space and the space gradually widens from a section where said electrode is disposed to a section where said curved corner is rested; and wherein said translucent type liquid display panel is disposed on an outgoing face of said light-conductive-panel.

7. A liquid crystal display device as claimed in claim 6, wherein said L-shaped fluorescent lamp further comprises a longer side disposed in the space and extending between said electrode and said curved corner, wherein the space where said longer side is located gradually widens from the section where said electrode is disposed to the section where said curved corner is disposed.

8. A liquid crystal display device as claimed in claim 6, wherein said L-shaped fluorescent lamp further comprises a shorter side disposed in the space and extending between said electrode and said curved corner, wherein the space where said shorter side is located gradually widens from the section where said electrode is disposed to the section where said curved corner is disposed.

9. A liquid crystal display device, comprising:

an translucent type liquid crystal display panel;

a lighting unit connected to said translucent type liquid crystal display panel, said lighting unit comprising:

an L-shaped fluorescent lamp having a curved corner and a shorter side, an electrode located at an end of said shorter side, a housing having a side wall, and a light-conductive-panel arranged in relation to said side wall such that a space is created therebetween, wherein said curved corner and said electrode of said L-shaped fluorescent lamp are located within the space and the space gradually widens from a section where said curved corner is disposed to a section where said electrode at said end of said shorter side is disposed; and wherein said translucent type liquid display panel is disposed on an outgoing face of said light-conductive-panel.

10. A liquid crystal display device, comprising:

an translucent type liquid crystal display panel;

a lighting unit connected to said translucent type liquid crystal display panel, said lighting unit comprising:

a U-shaped fluorescent lamp having a curved corner and an electrode at one end, a housing having a side wall, and a light-conductive-panel arranged in relation to said side wall such that a space is created therebetween, wherein said curved corner and said electrode of said U-shaped fluorescent lamp are located within the space and the space gradually widens from a section where said curved corner is disposed to a section where said electrode is disposed; and wherein and said translucent type liquid display panel is disposed on an outgoing face of said light-conductive-panel.

* * * * *